(12) United States Patent
Naderi

(10) Patent No.: US 12,269,242 B2
(45) Date of Patent: Apr. 8, 2025

(54) ENHANCED PVOH-BASED BARRIER LAYER COMPOSITION, BARRIER LAYER AND METHODS FOR ITS MANUFACTURE

(71) Applicant: BILLERUDKORSNAS AB, Solna (SE)

(72) Inventor: Ali Naderi, Arboga (SE)

(73) Assignee: Billerudkorsnas AB, Solna (SE)

( * ) Notice: Subject to any disclaimer, the term of this patent is extended or adjusted under 35 U.S.C. 154(b) by 770 days.

(21) Appl. No.: 17/296,119

(22) PCT Filed: Oct. 29, 2019

(86) PCT No.: PCT/EP2019/082771
§ 371 (c)(1),
(2) Date: May 21, 2021

(87) PCT Pub. No.: WO2020/109403
PCT Pub. Date: Jun. 4, 2020

(65) Prior Publication Data
US 2022/0009684 A1    Jan. 13, 2022

(30) Foreign Application Priority Data

Nov. 27, 2018 (EP) .................................. 18208433
Nov. 27, 2018 (EP) .................................. 18208434

(51) Int. Cl.
*B32B 27/30* (2006.01)
*B05D 1/38* (2006.01)
(Continued)

(52) U.S. Cl.
CPC ............... *B32B 27/30* (2013.01); *B05D 1/38* (2013.01); *B05D 3/0254* (2013.01); *B65D 25/14* (2013.01);
(Continued)

(58) Field of Classification Search
None
See application file for complete search history.

(56) References Cited

U.S. PATENT DOCUMENTS

2003/0124365 A1* 7/2003 Posey ..................... B32B 33/00
  428/510
2009/0312462 A1* 12/2009 Oakley ................... B29C 48/21
  524/47
2012/0272618 A1* 11/2012 Illsley ..................... C08J 7/048
  156/60

FOREIGN PATENT DOCUMENTS

JP    2008056775 A    3/2008
WO    WO99/46121 A1   9/1999
(Continued)

OTHER PUBLICATIONS

Lim et al: Enhanced oxygen-barrier and water-resistance properties of poly(vinyl alcohol) blended with poly(acrylic acid) for packaging applications : PVA blended with PAA for packaging applications, Polymer International, vol. 65, No. 4, Apr. 1, 2016 (Apr. 1, 2016), pp. 400-406.

*Primary Examiner* — Chinessa T. Golden
(74) *Attorney, Agent, or Firm* — Stites & Harbison PLLC; Richard S. Myers, Jr.

(57) ABSTRACT

There is provided a packaging material comprising a fibre based substrate and a gas barrier layer based on a polyvinyl alcohol (PVOH), wherein said gas barrier layer comprises an interpolymer complex forming agent (IPCFA), which IPCFA is a water-soluble polymer exhibiting functional groups capable of forming hydrogen bonds with —OH groups of the PVOH. Said PVOH has a weight average molecular weight ($M_w$) measured according to ASTM D4001-13 in the range of about 80 kg/mol to 135 kg/mol, the proportion of said IPCFA to PVOH in said gas barrier layer is in the range of 0.5 to 7.0% (w/w) and said packaging
(Continued)

material has an oxygen permeability (OP) below 14 ml µm/m² day atm, which OP is obtained by multiplying the oxygen transmission rate (OTR) of the packaging material measured according to ASTM F1927-7 at a relative humidity (RH) of 80% and 23° C. by the thickness of the gas barrier layer.

12 Claims, 9 Drawing Sheets

(51) Int. Cl.
| | |
|---|---|
| *B05D 3/02* | (2006.01) |
| *B65D 25/14* | (2006.01) |
| *B65D 65/42* | (2006.01) |
| *B65D 85/72* | (2006.01) |
| *C08J 5/00* | (2006.01) |
| *C09D 5/00* | (2006.01) |
| *C09D 129/04* | (2006.01) |
| *D21H 19/20* | (2006.01) |
| *D21H 27/10* | (2006.01) |

(52) U.S. Cl.
CPC ............ *B65D 65/42* (2013.01); *B65D 85/72* (2013.01); *C08J 5/00* (2013.01); *C09D 5/00* (2013.01); *C09D 129/04* (2013.01); *D21H 19/20* (2013.01); *D21H 27/10* (2013.01); *B05D 2203/00* (2013.01); *B05D 2507/005* (2013.01)

(56) References Cited

FOREIGN PATENT DOCUMENTS

| | | |
|---|---|---|
| WO | WO2004/089624 A2 | 10/2004 |
| WO | WO03/041955 A1 | 3/2008 |
| WO | WO2011/061510 A1 | 5/2011 |
| WO | WO2015/178856 A1 | 11/2015 |

\* cited by examiner

ENHANCED PVOH-BASED BARRIER LAYER COMPOSITION, BARRIER LAYER AND METHODS FOR ITS MANUFACTURE

CROSS REFERENCE TO RELATED APPLICATIONS

This application is a § 371 National Phase Application of PCT/EP2019/082771 filed Nov. 27, 2019, which claims priority to EP18208433.5 filed Nov. 27, 2018 and EP18208434.3 filed Nov. 27, 2018.

TECHNICAL FIELD

The present disclosure relates to the field of packaging materials, and in particular to an enhanced PVOH-based barrier layer and methods for its manufacture, as well as packaging materials comprising said barrier layer and packages made thereof, in particular packages for sensitive products, such as but not limited to food, beverages, and pharmaceuticals.

BACKGROUND

The packaging manufacturing industry faces a major challenge to develop concepts that enable the production of packages based on sustainable resources, and which can be produced at lower cost and/or energy consumption levels than currently is the case. This concerns in particular those segments of industry that produce packaging for sensitive products such as food, beverages and pharmaceuticals.

Currently, these packaging products contain several layers of fossil-based polymers such as polyethylene, and aluminum, which shield the sensitive content from odor, moisture, oxygen and light—in varying ambient conditions (e.g. humidity and temperature). It is interesting to note that even though aluminum constitutes the smallest barrier component in the packaging product, the aluminum accounts for most of the energy that is consumed in the packaging manufacturing process. Efforts to replace these materials are ongoing, but not free from challenges.

Polyvinyl alcohol (PVOH) is a non-ionic water-soluble polymer that possesses attractive properties, such as biodegradability and the ability to form effective barrier layers against grease and oil, including mineral oils. Furthermore, the hydrogen bonds between the hydroxyl groups of the polymer chains together with the semi-crystalline structure of the polymer enable the formation of dense layers, which make PVOH one of the best available polymer-based gas barriers. Finally, PVOH is an approved material for food packaging, in accordance to official regulations such as those issued by the German Bundesinstitut für Risikobewertung (BfR) or the U.S. Food and Drug Administration (FDA); hence, PVOH is a highly attractive material for the packaging industry.

WO 2013/064500 (Johan Larsson and Anders Karlsson) discloses a curtain coatable gas barrier coating composition comprising a polymer and a surfactant, wherein the polymer is selected from a group consisting of polyvinyl alcohol and polysaccharides, or mixtures thereof, wherein said polysaccharides are soluble or dispersable or suspendable in water and the surfactant is a water soluble non-ionic ethoxylated alcohol. WO 2013/064500 also relates to a method for providing a substrate with a gas barrier layer by means of the coating composition, and a coated substrate having at least one gas barrier layer obtained by coating the substrate with the coating composition. Further, WO 2013/064500 relates to a packaging material comprising a coated paperboard coated with the coating composition, and a liquid package comprising such a packaging material.

However, a major impediment for the wider implementation of PVOH as an effective barrier in the packaging industry is the hydrophilicity of the polymer, which gravely diminishes the effectiveness of the barrier at high humidity conditions. The term "high humidity conditions" herein refers to >50% relative humidity (RH) or even >80% RH.

There are different approaches to addressing this deficiency. It has for example been attempted to improve the barrier properties of PVOH films by adding nanofillers. Nanofillers are particles characterized by high surface areas and high aspect ratios. The high surface areas and aspect ratios are beneficial in barrier applications, since the particles when applied optimally, make the diffusion of the gas molecules through the coating layer more difficult. However, an optimal application (homogeneous distribution) of the nanofiller particles in polymer matrixes is difficult to achieve through industrially relevant, i.e. simple and affordable, processes.

This is explained by the high aspect ratios and surface areas of nanofillers, which lead to severe aggregation of the nanoparticles. Hence, excessive amounts of the nanofiller, such as >>10% (w/w) based on the amount of the polymer matrix, must be used for achieving attractive gas barrier properties. This shortcoming is problematic, as the stress-points that are caused by the nanofiller aggregates can lead to the deterioration of the mechanical properties of the nano-composite.

Another approach for the improvement of barrier properties of PVOH in humid conditions is the crosslinking of the PVOH polymer chains. This is generally brought about by the mixing of PVOH and a crosslinking agent prior to application of the formulation onto a substrate or a substrate and the subsequent drying. However, as the following citations will demonstrate, this approach often involves the employment of chemicals or processes that are not preferentially used in the pulp and paper industry. More significantly, the improvements that have been achieved by this route are seemingly modest.

There have been indications (see Labuschagne et al., 2008) that the gas barrier properties of PVOH could improve by the densification of the amorphous part of the semi-crystalline PVOH layer. The densification of the amorphous parts of the PVOH layer can be achieved through the interpolymer complexation process. This is obtained through the addition of a polymer, which can strongly interact with PVOH through strong hydrogen bonding interactions. Labuschagne et al. reported a three-fold improvement in the barrier property upon the addition of 20% (w/w) poly(methyl vinyl ether co-maleic acid) to PVOH.

WO 2004/089624 (A. J. Kruger and P. A. Truter) concerns the use of an interpolymer complexation concept. In this application the inventors exemplified their invention with a formulation that on the dry basis consisted of 30% (w/w) poly(methyl vinyl ether co-maleic acid) and 70% (w/w) PVOH. It is interesting to note that the barrier properties improved only three-fold for a 25 µm barrier layer based on the said formulation, which is not an extraordinary achievement.

In a more recent study (Lim et al., 2016), the oxygen-barrier and water-resistance properties of poly(vinyl alcohol) blended with poly(acrylic acid) for packaging applications were investigated. Here PVOH was crosslinked using polyacrylic acid through an esterification process, which required the drying of the coating for one hour at 150° C.

The authors reported an improvement of about three times, when the barrier properties were measured at 0% RH.

It remains to make available PVOH-based barrier layers that perform well at high humidity conditions, i.e. at 50% RH and higher, and which can be produced by processes suitable for industrial application.

SUMMARY

The present disclosure sets out to address the problems of the prior art, and makes available an improved method for forming a PVOH-based barrier layer, a PVOH-based barrier layer exhibiting excellent properties, packaging materials comprising said layer, as well as packaging products, i.e. packages and in particular packages for sensitive products such as food, beverages and pharmaceuticals.

According to a first aspect, the present disclosure makes available a packaging material comprising a fibre based substrate and a gas barrier layer based on a polyvinyl alcohol (PVOH), wherein said gas barrier layer comprises an interpolymer complex forming agent (IPCFA), which IPCFA is a water-soluble polymer exhibiting functional groups capable of forming hydrogen bonds with —OH groups of the PVOH, characterized in that the proportion of said IPCFA to PVOH in said gas barrier layer is in the range of 0.5 to 7.0% (w/w) and said packaging material has an oxygen permeability (OP) below 14 ml μm/m² day atm, which OP is obtained by multiplying the oxygen transmission rate (OTR) of the packaging material by the thickness of the gas barrier layer. The OTR is measured according to ASTM F1927-07 at a relative humidity (RH) of 80% and a temperature of 23° C. Alternatively, it may be measured according to ASTM D3985.

The thickness of the gas barrier layer is preferably obtained by dividing the coat weight of the gas barrier layer by the density of the gas barrier layer. In one embodiment, the density of the gas barrier layer is assumed to be 1.30 g/cm³. Such an assumption may be particularly useful when the gas barrier layer comprises substantially no nanofiller.

Notably, the PVOH-based barrier is primarily a gas barrier, but is also to some extent a barrier for vapors and liquids.

The relatively low concentration of IPCFA in the PVOH typically reduces costs and is environmentally beneficial (e.g. degradability and/or recyclability). Further, a lower amount of IPCFA typically leads to less migration issues.

The fibre based substrate is typically based on cellulose fibres or cellulose fibrils. The fibres or fibrils are preferably wood-derived.

According to an embodiment of said first aspect, said IPCFA has a weight average molecular weight ($M_w$) in the range of 10 kg/mol to 1500 kg/mol, such as 25 kg/mol to 1500 kg/mol or 10 kg/mol to 1000 kg/mol, preferably in the interval of 30 kg/mol to 700 kg/mol, more preferably in the interval of 50 kg/mol to 500 kg/mol and most preferably in the interval of 100 kg/mol to 700 kg/mol, such as 200 kg/mol to 700 kg/mol. As shown in FIG. 2, IPCFAs within these $M_w$ ranges have an optimum concentration in PVOH in the range of 1-5%.

According to an embodiment of said first aspect, freely combinable with the above aspect and embodiments thereof, said IPCFA is neither a cellulose or cellulose-based polymer nor a polymer comprising optionally substituted styrene groups. The cellulose or cellulose-based polymer may be too rigid to for tight complexes with PVOH. Similarly, the styrene groups may interfere with the hydrogen bonding to PVOH.

The IPCFA is preferably a linear polymer, such as a linear homopolymer. The IPCFA may be non-ionic.

According to an embodiment of said first aspect, freely combinable with the above aspect and embodiments thereof, a repeating unit of said IPCFA comprises an amide group, a carboxyl group or a pyrrolidone group.

According to a preferred embodiment, said IPCFA is thus a linear polymer comprising a repeating unit comprising an amide group, a carboxyl group or a pyrrolidone group, with the proviso that said linear polymer is not cellulose-based and does not comprise a repeating unit having an optionally substituted styrene group.

For example, said IPCFA may be chosen from the group consisting of polyacrylic acid, polyvinyl pyrrolidone, poly (methyl vinyl ether-alt-maleic acid), and non-ionic polyacrylamide. The group may be limited to polyacrylic acid, polyvinyl pyrrolidone, and non-ionic polyacrylamide.

According to another embodiment of said first aspect, freely combinable with the above aspect and embodiments thereof, the proportion of said IPCFA in relation to PVOH in the gas barrier layer is in the interval of 0.5-6%, 1-6% (w/w), such as 1-5% (w/w), preferably in the interval of 1 to 4% (w/w), more preferably 2 to 3% (w/w).

According to another embodiment of said first aspect, freely combinable with the above aspect and embodiments, the PVOH has a weight average molecular weight ($M_w$) in the range of 10 kg/mol to 500 kg/mol, preferably 50 kg/mol to 300 kg/mol, and more preferably about 80 to 200 kg/mol and most preferably 80 kg/mol to 135 kg/mol. An advantage thereof is that a significant improvement of the oxygen barrier properties is obtained already at relatively low concentration of the IPCFA.

According to a further embodiment of said first aspect, freely combinable with the above aspect and embodiments, said PVOH has a degree of hydrolysis of 98 to 100%.

According to yet another embodiment of said first aspect, freely combinable with the above aspect and embodiments, said gas barrier layer further comprises a nanofiller, preferably a nanofiller chosen from the group consisting of bentonite, kaolin, montmorillonite and mica.

According to an embodiment thereof, the nanofiller is present in the interval of about 1 to about 50 weight-%, preferably about 5 to about 30 weight-%, and more preferably about 10 to about 20 weight-% based on the weight of the polymeric compounds.

The oxygen barrier layer may also be substantially free from nanofiller.

According to another embodiment of said first aspect, freely combinable with the above aspect and embodiments, the coat weight of the gas barrier layer is in the interval of 0.8 to 8.0 g/m², preferably 1.2-4.0 g/m², and more preferably 1.6-3.2 g/m².

According to yet another embodiment of said first aspect, freely combinable with the above aspect and embodiments, said fibre based substrate is a paper or paperboard comprising at least one fibre based layer. The grammage of the paper or paperboard may for example be in the range of 25-400 g/m² (measured according to ISO 536:2012). In one embodiment, the substrate is a paper having a grammage of 25-140 g/m² (ISO 536:2012). In another embodiment, the substrate is a multilayered paperboard having a grammage of 140-400 g/m² (ISO 536:2012).

According to yet another embodiment of said first aspect, freely combinable with the above aspect and embodiments, said gas barrier layer has an oxygen transmission rate (OTR) in the interval of 0.1 to 3 ml/m² day atm, preferably in the interval of 0.1 to 2.5 ml/m² day atm, and most preferably 0.1 to 1 ml/m² day atm, measured according to ASTM F1927-07 at a relative humidity (RH) of 50% and 23° C.

According to yet another embodiment of said first aspect, freely combinable with the above aspect and embodiments, said gas barrier layer has an oxygen transmission rate (OTR) in the interval of 0.5 to 3 ml/m² day atm, preferably in the interval of 0.5 to 2.5 ml/m² day atm, and most preferably 0.5 to 1 ml/m² day atm, measured according to ASTM F1927-07 at a relative humidity (RH) of 80% and 23° C.

According to a second aspect, the present disclosure makes available a method for the production of a packaging material according to the first aspect, wherein a coating composition comprising said PVOH and said IPCFA dissolved in a first solvent is provided, and said coating composition is applied onto said substrate to form said PVOH-based gas barrier layer. The embodiments of the first aspect discussed above apply to the second aspect mutatis mutandis.

According to an embodiment of the second aspect, the formation of said PVOH-based gas barrier layer comprises drying the applied coating composition at a temperature below the boiling point of said first solvent.

According to another embodiment of the second aspect, freely combinable with the above, said PVOH-based layer, after it has been dried, is crosslinked by contacting it with a crosslinking agent and optionally a catalyst to achieve crosslinking of the polymers. Crosslinking after drying has a better effect on the barrier properties than crosslinking before drying.

After the contact with the crosslinking agent, said PVOH-based layer is typically dried, again at a temperature below the boiling point of the solvent in which the crosslinking was applied. After such drying, said PVOH-based layer may be subjected to a heating step, which typically is heating to a temperature in the interval of 101-170° C., preferably in the interval of 130 to 160° C. and most preferably in the interval of 140 to 150° C. Thereby, a curing effect can be obtained.

According to a further embodiment of said second aspect, freely combinable with the above aspect and embodiments, said coating composition is applied onto the fibre based substrate by curtain coating, blade coating, rod coating, spray or roll coating, or a combination of two or more thereof.

A third aspect of the present disclosure is a package or container comprising a packaging material according to the first aspect or one or more embodiments thereof. Said package is preferably a package for an edible product, a foodstuff, a beverage or a pharmaceutical.

Further aspects and embodiments thereof will be apparent to a skilled person upon study of the following claims and the description, including the figures and examples.

SHORT DESCRIPTION OF THE FIGURES

Figure 3A:
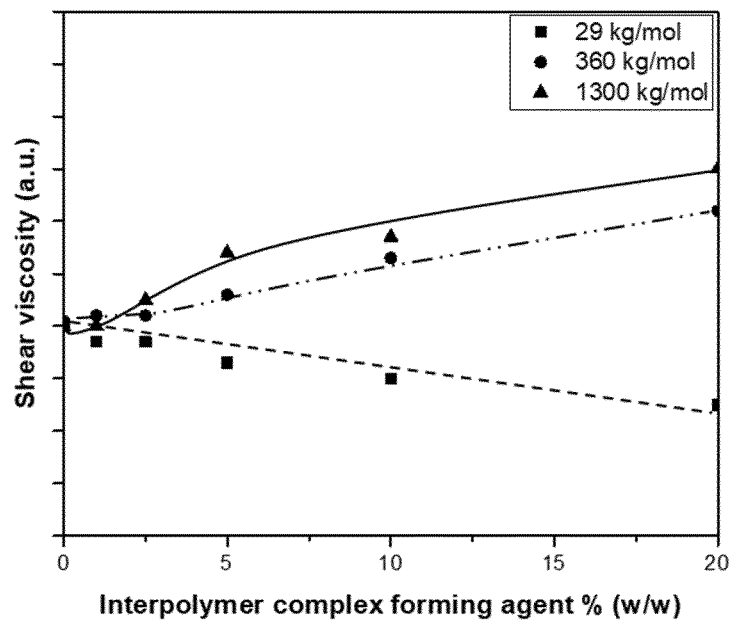
FIG. 3 shows the shear viscosity as a function of the concentration of PVPs of different weight average molecular weights in different PVOH qualities.
Figure 3B:
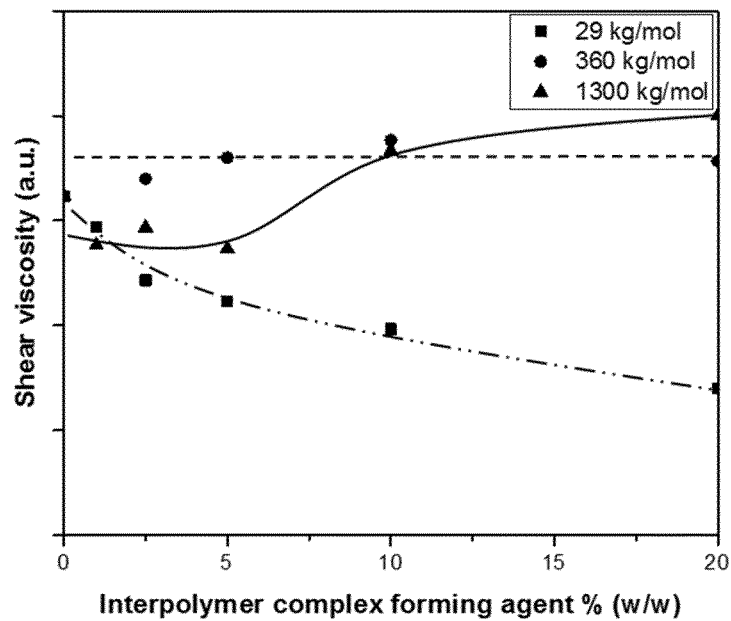
Figure 3C:
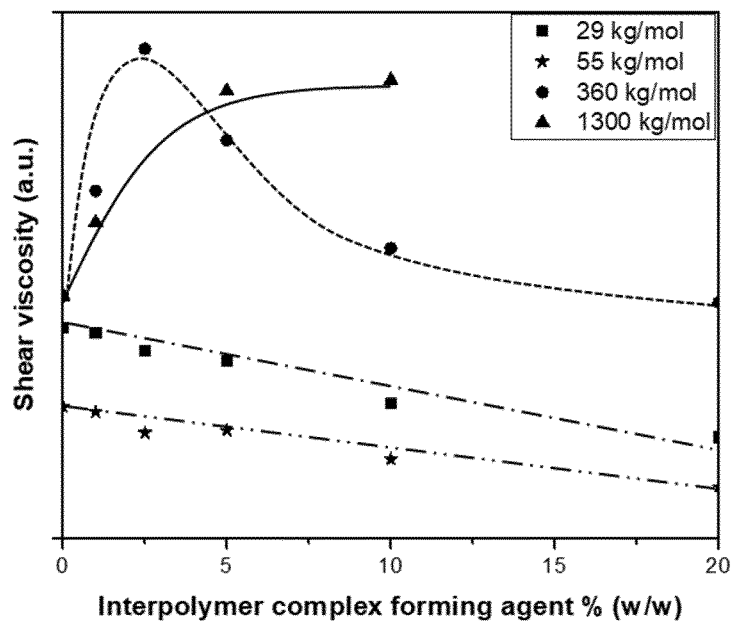
Figure 3D:
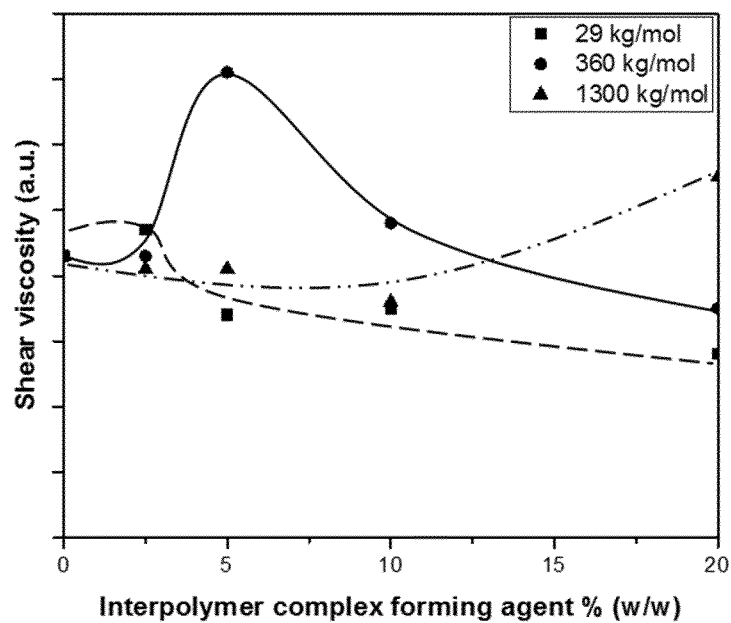
Figure 3E:
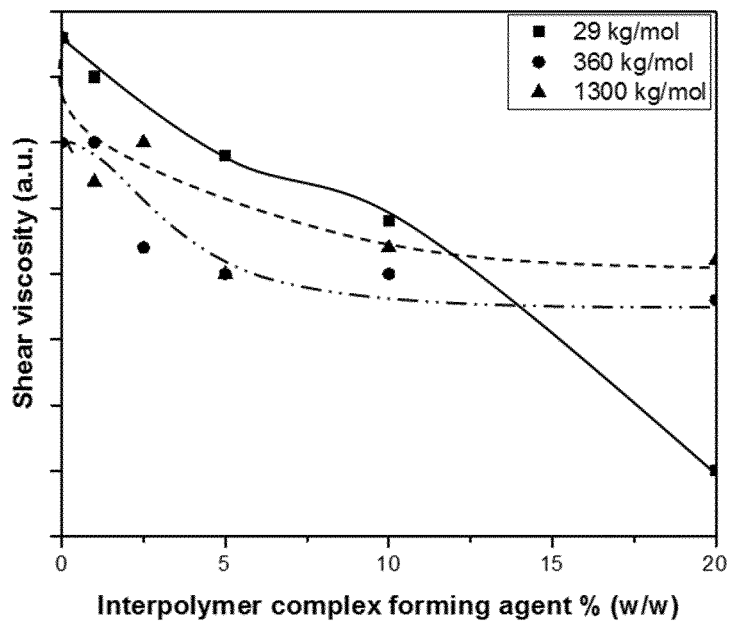

In FIG. 3A, the PVOH quality is POVAL 6/98 ($M_w$=47 kg/mol);

In FIG. 3B, the PVOH quality is Mowiol 10/98 ($M_w$=61 kg/mol);

In FIG. 3C, the PVOH quality is POVAL 15/99 (estimated $M_w$=100 kg/mol);

In FIG. 3D, the PVOH quality is Mowiol 20/98 ($M_w$=125 kg/mol);

In FIG. 3E, the PVOH quality is POVAL 15/99 ($M_w$=145 kg/mol); and

Figure 3F:
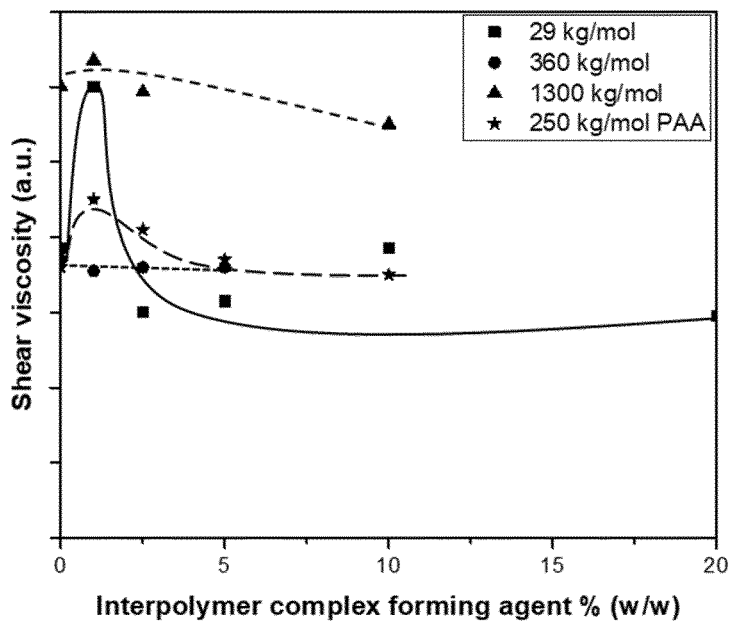

In FIG. 3F, the PVOH quality is 363146 (Sigma Aldrich) ($M_w$=85-124 kg/mol). FIG. 3F also includes a PAA.

Figure 3G:
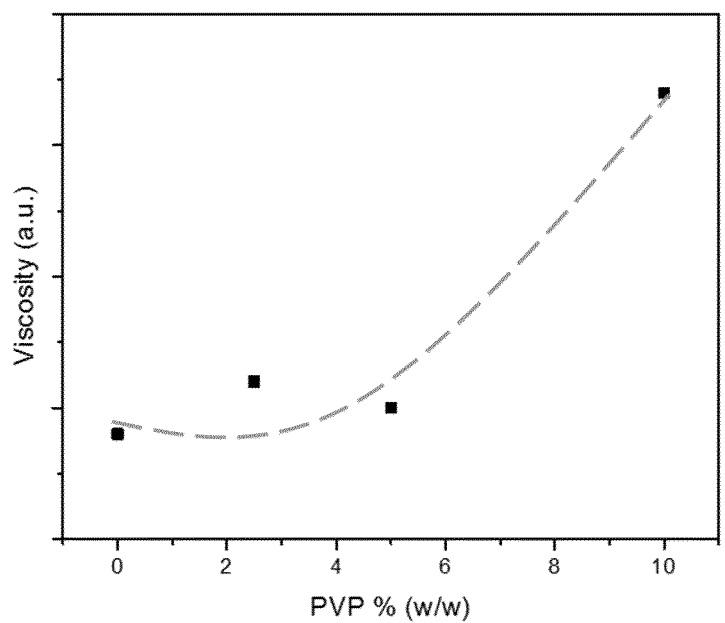

FIG. 3G shows a reference experiment with Exceval AQ4104, which is a modified PVOH with properties similar to EVOH that has an estimated $M_w$ of 70 kg/mol, and a PVP having an $M_w$ of 360 kg/mol.

Figure 4A:
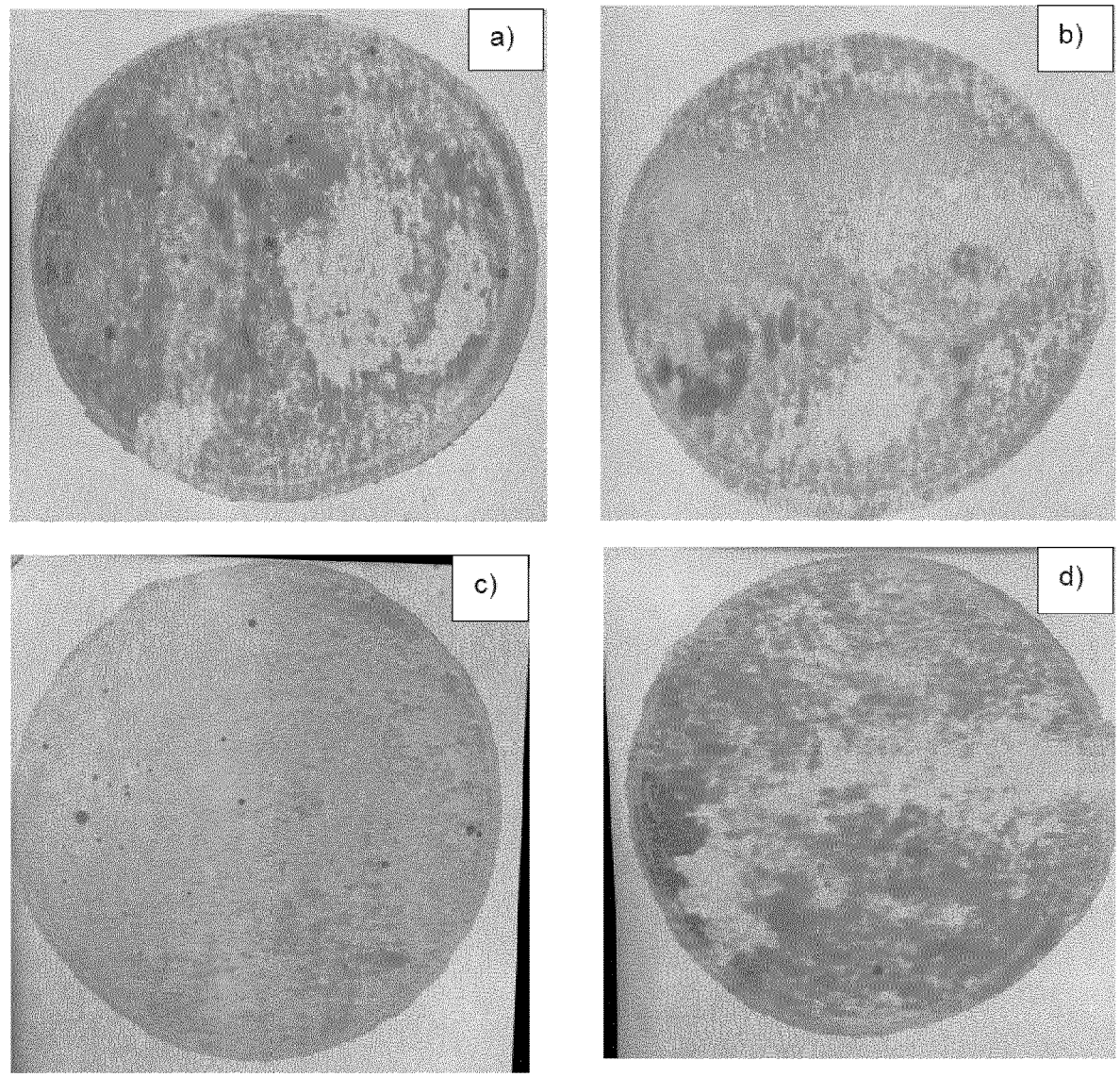
Figure 4B:
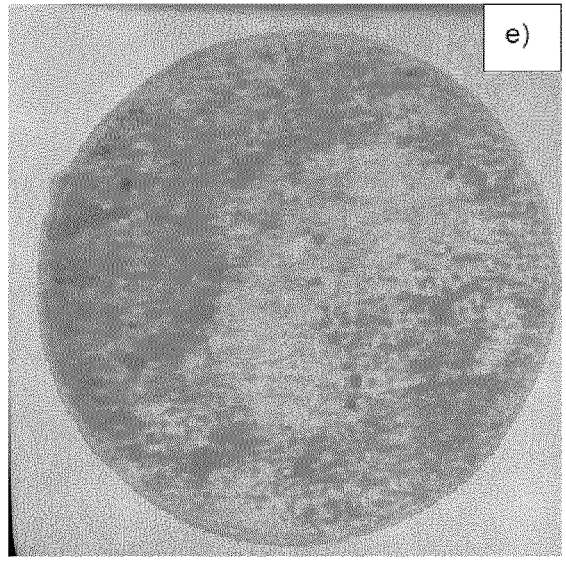
Figure 4B:
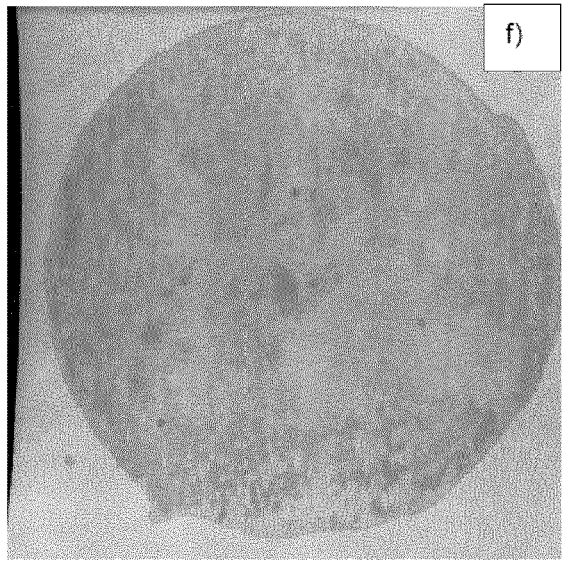
Figure 4B:
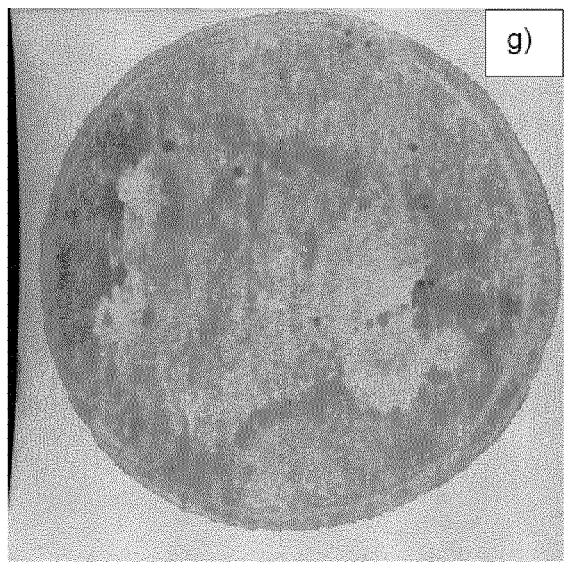
Figure 4B:
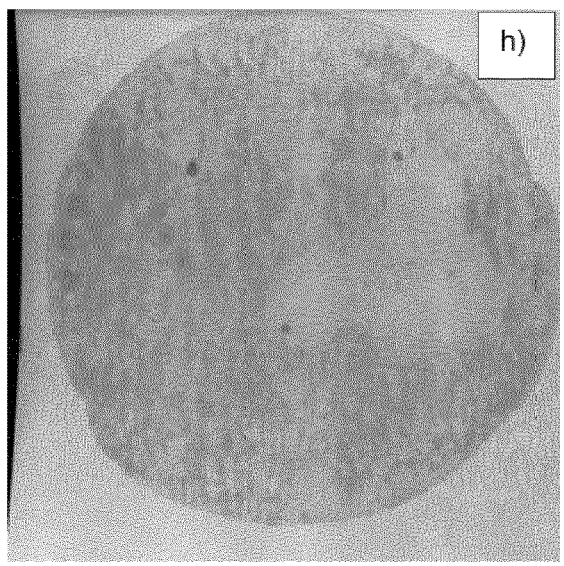

FIGS. 4a and b show the pinhole test results of cardboard substrates coated with the experimental coating formulations: a) Pure PVOH; b) PVOH containing 10% (w/w) nanofiller; c) PVOH-PMV (2.5% (w/w)); d) PVOH-PMV (2.5% (w/w)) 10% nanofiller; e) PVOH-PAA (1% (w/w)); f) PVOH-PAA (1% (w/w)) 10% (w/w) nanofiller; g) PVOH-PW (2.5% (w/w)); and h) PVOH-NPA (2% (w/w)).

Figure 5A:
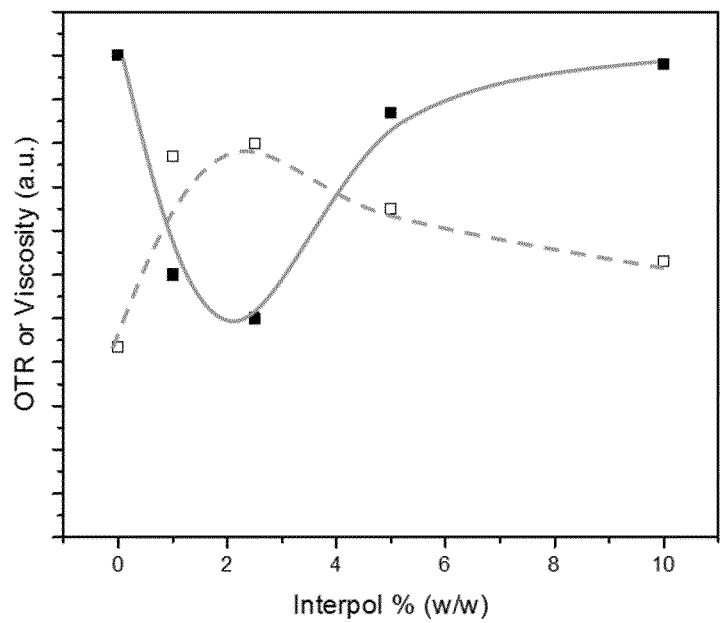

FIG. 5A shows the viscosity (empty squares/dashed line) and OTR at 80% RH and 23° C. (filled squares/solid line) as a function of the concentration of PMV ($M_w$=216 kg/mol) in PVOH (POVAL 15/99).

Figure 5B:
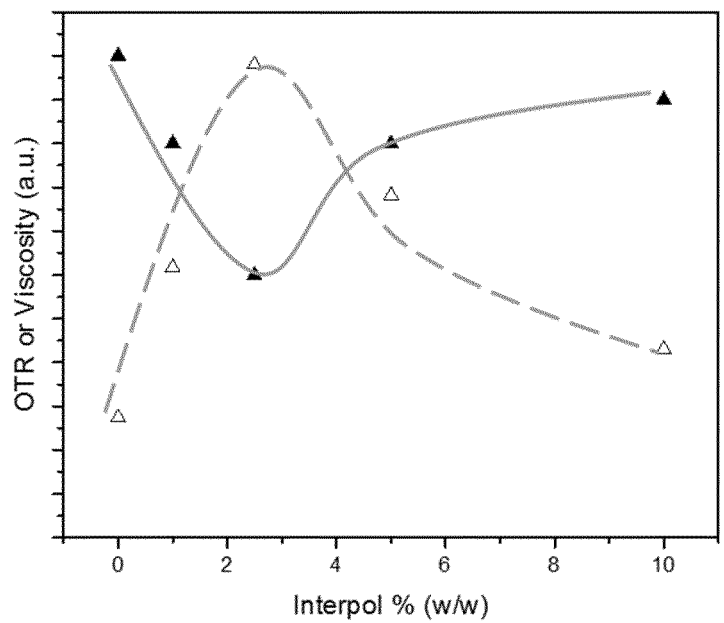

FIG. 5B shows the viscosity (empty triangles/dashed line) and OTR at 80% RH and 23° C. (filled triangles/solid line) as a function of the concentration of PVP ($M_w$=360 kg/mol) in PVOH (POVAL 15/99).

Figure 5C:
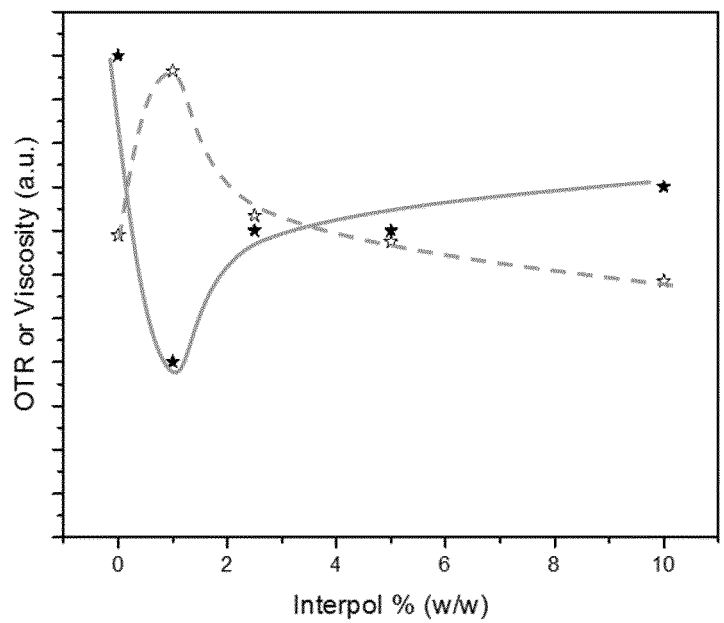

FIG. 5C shows the viscosity (empty stars/dashed line) and OTR at 80% RH and 23° C. (filled stars/solid line) as a function of the concentration of PAA ($M_w$=250 kg/mol) in PVOH (POVAL 15/99).

DESCRIPTION

The term "substrate" refers to any substrate for which improved barrier properties are desired, and onto which a PVOH-based coating can be applied. The present disclosure is primarily concerned with cellulose and/or fibre based substrates, such as films or paper including paperboard made of or comprising cellulose fibres and/or cellulose fibrils.

The term "fibre" encompasses cellulose fibre, such as virgin fibre, for example bleached and/or unbleached kraft pulp, or chemithermomechanical pulp (CTMP), but also includes recirculated fibre, pulped recycled paper, such as pulped newsprint, de-inked pulp (DIP) etc.

"Molecular weight" typically refers to weight average molecular weight ($M_w$), which can be determined according to the standard ASTM D4001-13.

According to the first aspect, there is provided a packaging material comprising a fibre based substrate and a gas barrier layer based on a polyvinyl alcohol (PVOH), wherein said gas barrier layer comprises an interpolymer complex forming agent (IPCFA), which IPCFA is a water-soluble polymer exhibiting functional groups capable of forming hydrogen bonds with —OH groups of the PVOH. The proportion of said IPCFA to PVOH in said gas barrier layer is in the range of 0.5 to 7.0% (w/w) and said packaging material has an oxygen permeability (OP) below 14 ml μm/m² day atm, which OP is obtained by multiplying the oxygen transmission rate (OTR) of the packaging material measured according to ASTM F1927-07 at a relative humidity (RH) of 80% by the thickness of the gas barrier layer.

Said barrier layer inhibits the migration of gases and also, to some extent, vapors and liquids.

The proportion of said IPCFA in relation to PVOH in the barrier layer may be in the interval of 1-5% (w/w), preferably in the interval of 2 to 3% (w/w). This is a surprisingly small amount, in particular when compared to previous publications teaching the addition of about 30% of interpolymer complex forming polymers.

Said PVOH preferably has a degree of hydrolysis of at least about 98% or in the interval of about 98 to 100%. Further, fully saponified grades of PVOH are preferably used. Different qualities of PVOH having a degree of hydrolysis of about 98-100% are available, for example products having the following $M_w$: 13-23 kg/mol, 27 kg/mol, 31-50 kg/mol, 89-98 kg/mol, 85-124 kg/mol, 125 kg/mol, 130 kg/mol, 145 kg/mol, 146-186 kg/mol, and 195 kg/mol.

Again without wishing to be bound by theory, the present inventor has found that the molecular weight of the PVOH, as well as that of the IPCFA, and the combinations thereof, have significance. Beneficial molecular weights for the PVOH and the IPCFA are discussed above.

PVOH-products are frequently characterized by the viscosity of a 4 solution. A skilled person is well familiar with different standard methods for determining the viscosity of polymers, for example using a capillary-type viscosimeter, for example an Ubbelohde-type viscometer or an Ostwald-type viscosimeter. Notably PVOH products having a viscosity above 5 mPas have obtained FDA/BfR approval.

Thus, according to a further embodiment of said first aspect, freely combinable with the above aspect and embodiments, the viscosity of the PVOH is preferably in the interval of about 4 to 28 mPas as determined at 20° C. according to the standard DIN 53015/JIS K 6726, preferably above 5 mPas as PVOH products having a viscosity above 5 mPas have obtained FDA/BfR approval for use in food packaging applications.

The experimental results presented below indicate that that combined used of an IPCFA and a nanofiller may not only make it possible to reduce the amount of both components, but also may have a positive effect in that the formation of pinhole defects is diminished (See FIG. 4). The reduction of the amount of nanofillers, made possible by the inclusion of IPCFA:s in the composition is advantageous also because it reduces the risk of the barrier layer become brittle, a property sometimes associated with nanofillers.

While a nanofiller-free barrier layer is desired for most applications, the possibility of combining IPCFA:s and a reduced amount of nanofillers is desirable in some applications. When coating three-dimensional objects, or substrates that are required to be flexible in the subsequent packaging applications, in the filling, closure or other handling steps, where the flexibility and durability of the barrier layer is very important, it will be a considerable advantage if the content of nanofillers can be minimized or entirely avoided.

The coat weight of the barrier layer is typically in the interval of 0.8 to 8.0 g/m$^2$, preferably 1.2-4.0 g/m$^2$, and more preferably 1.6-3.2 g/m$^2$.

The substrate is a fibre-based substrate, such as paper or paper board comprising at least one fibre based layer.

The second aspect of the present disclosure relates to a method for the production of a packaging material according to the first aspect, wherein a coating composition comprising said PVOH and said IPCFA dissolved in a first solvent is provided and said coating composition is applied onto said substrate to form said PVOH-based gas barrier layer.

Said coating composition may be applied onto the substrate by curtain coating, blade coating, rod coating, spray or roll coating, or a combination of two or more thereof.

A person skilled in the relevant art is familiar with the techniques for coating substrates, in particular fibre based substrates such as paperboards. Curtain coating is a coating process in which a linear flow of a liquid coating composition is deposited on a surface of a moving substrate, such as paper web. The coating composition forms a liquid sheet that falls freely before impinging onto the moving substrate that is to be coated.

The formation of said PVOH-based gas barrier layer may comprise drying the applied coating composition at a temperature below the boiling point of said first solvent. Examples of drying methods are air drying using hot air, xenon flash heating, UV radiation, IR radiation, microwave-based drying and convection heating.

After the PVOH-based layer has been dried, it may be crosslinked by contacting it with a crosslinking agent (and optionally a catalyst) to achieve crosslinking of the polymers. Crosslinking after drying has a better effect on the barrier properties than crosslinking before drying.

After the contact with the crosslinking agent, said PVOH-based layer is typically dried, again at a temperature below the boiling point of the solvent in which the crosslinking was applied. Examples of drying methods are discussed above. After such drying, said PVOH-based layer may be subjected to a second heating step, which typically is heating to a temperature in the interval of 101-170° C., preferably in the interval of 130 to 160° C. and most preferably in the interval of about 140 to about 150° C. This heating can be performed for 1 to 10 s, or for 1 to 3 minutes. Different methods of heating can be employed, such as hot air heating, xenon flash heating, UV radiation-based heating, IR radiation-based heating, microwave-based heating or convection heating.

The method has proven to be very robust, and the inventor has for example shown that the coating composition and crosslinking compositions can be prepared in tap water, which constitutes an advantage when the method is applied in an industrial scale.

A third aspect of the present disclosure is a package or container comprising a packaging material according to the first aspect. Said package is preferably a package for an edible product, a foodstuff, a beverage or a pharmaceutical.

EXAMPLES

The inventors have performed extensive experimental work using a non-modified PVOH layer as reference, obtaining improved barrier properties at high relative humidity.

Materials

PET-plastic films were used as the substrate in rod coating experiments. Duplex 370 carton board (BillerudKorsnas AB, Sweden) was used as the substrate in curtain coating experiments (the brown side of the board was coated).

KURARAY POVAL® 15-99 (Kuraray America Inc.) was used as the PVOH in the experiments presented in Table 1 below and in FIGS. 2-5. This polymer has a degree of hydrolysis of 99% and a viscosity of 12.5-17.5 mPa·s (measured at 4% (w/w)), estimated $M_w$=about 100 kg/mol. The following PVOHs were also used in the experiment presented in FIG. 3:

POVAL 6/98, $M_w$=47 kg/mol (visc. at 4% (w/w)=4-5 mPas);

Mowiol 10/98 $M_w$=61 kg/mol (visc. at 4% (w/w)=9-11 mPas);

Mowiol 20/98 $M_w$=125 kg/mol (visc. at 4% (w/w)=9-11 mPas);

Poval 28/99 $M_w$=145 kg/mol (visc. at 4% (w/w)=26-30 mPas); and

Poly(vinyl alcohol), Sigma Aldrich product nr. 363146 $M_w$=85-124 kg/mol.

In the reference experiment presented in FIG. 3G, Exceval AQ4104 (kuraray), which is an EVOH quality having an estimated $M_w$ of 70 kg/mol, was used.

Other components were:
CLOISITE®-Na+ (Southern Clay Products/BYK Additives & Instruments), which is a micro-granulated nanofiller; and LUTENSOL® ON70 (BASF/BTC Europe GmbH), which is a fatty alcohol ethoxylate.

Interpolymers:
Nonionic polyacrylamide from Sigma Aldrich with Mn of about 40 kg/mol ($NPA_{low}$) and 150 kg/mol ($NPA_{high}$) corresponding to $M_w$ about 74 kg/mol and 400 kg/mol, respectively.

Poly(methyl vinyl ether-alt-maleic acid) with Mn of about 960 kg/mol ($PMV_{high}$) and 80 kg/mol ($PMV_{low}$) corresponding to $M_w$ about 1980 kg/mol and 216 kg/mol, respectively, was kindly provided by Ashland Global Specialty Chemicals Inc;

Polyacrylic acid with $M_w$ of about 250 kg/mol ($PAA_{low}$) and about 1300 kg/mol ($PAA_{high}$); and Polyvinyl pyrrolidone with $M_w$ of 29 kg/mol ($PVP_{low}$), 360 kg/mol ($PVP_m$) and 1300 kg/mol ($PVP_{high}$). In addition, a PVP having an $M_w$ of 55 kg/mol was included in the experiment presented in FIG. 3C.

Tap water was used in all experiments.

Methods

1. Preparation of Polymer Solutions in Laboratory Scale (for Rheological Studies)

The PVOH-PMV, PVOH-PAA and PVOH-PVP solutions were prepared by adding the polymers to water under continuous stirring at room temperature, prior to heating for one hour at 95° C.

PVOH-NPA solutions were prepared by first preparing stock solutions of the different polymers. PVOH (ca 9% (w/w)) was prepared by mixing at 95° C. for one hour, and NPA stock solution (1% (w/w)) was prepared through continuous stirring overnight at room temperature. The NPA was added to the PVOH solution at 60° C. under stirring. The system was thereafter removed from the heater and stirred for an additional period of ten minutes.

2. Preparation of Polymer Solutions in Laboratory Scale (for Barrier Studies)

A similar protocol as in the previous section was employed for the preparation of the polymer blends. However, in the studies in which nanofiller (CLOISITE®-Na+) was employed, the nanofiller was first dispersed in water during ten minutes, before the addition of the polymers and subsequent heating. LUTENSOL® N070 (0.4% (w/w)) was added to the polymer blends at 40° C.

3. Preparation of Polymer Solutions in Semi-Pilot Scale (for Barrier Studies)

An industrial boiling kettle with a capacity of 50 liters was employed. The preparation of the different polymer blends was conducted in a similar manner as described above. The amount of LUTENSOL® N070 was 0.4% w/w in the curtain coating formulations. The optimal amount of LUTENSOL® for each of the polymer blends was not investigated.

4. Coating of the Substrate with PVOH-Based Formulations

In laboratory scale experiments, the polymeric solutions were applied on the plastic substrate by a laboratory rod-coater. The coating was thereafter dried by IR.

In a semi-pilot scale set-up, the coating was performed using a laboratory-scale curtain coater. The conveyer speed was about 6.5 m/s and the pumping rate about 3 l/min. The resulting coated substrates were dried at 60° C. for 20 min in a laboratory oven.

5. Rheological Studies

The shear viscosity of polymer suspensions was measured at 25° C. using a rheometer (TA Instruments Ltd., Delaware, USA) with bob and cup geometry (smooth surfaces). The viscosities were measured in the range of 10-1000 $s^{-1}$.

6. Barrier Properties

The OTR (measured at 80% RH/23° C.) of the coated films were measured using an OX-TRAN® instrument from Mocon Inc. according to ASTM F1927-07. The oxygen permeation rates (OP) of the different systems were calculated by normalization of the measured OTR values with the thickness of the coating. Preliminary thickness values were obtained by SEM measurements. For the SEM measurements, a sample was molded in an epoxy resin to permeate the material's pore system to encase the film. The specimen was then cut to expose a fresh surface, and that surface was then polished using a series of successively finer grades of diamond paste. The cross section was then analyzed by SEM.

8. Evaluation with Regard to Pinholes

The brown side of Duplex 370 carton board (BillerudKorsnas AB, Sweden) was coated with the experimental compositions using curtain coating. The pinhole test was performed according to the INS-06271-v.2.0 protocol.

Results

Figure 1:
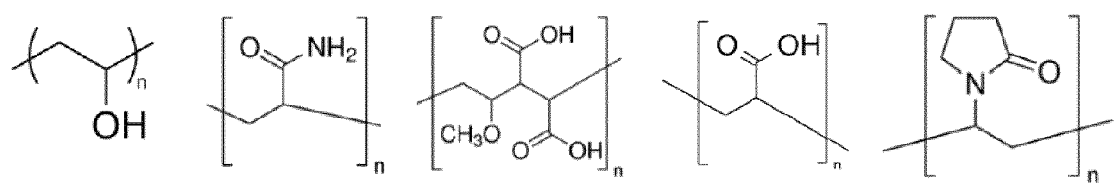
FIG. 1 shows, from left to right, the chemical structures of polyvinyl alcohol, nonionic polyacrylamide, poly(methyl vinyl ether-alt-maleic acid), polyacrylic acid and polyvinyl pyrrolidone, interpolymer complex forming polymers tested in the examples.
Figure 2:
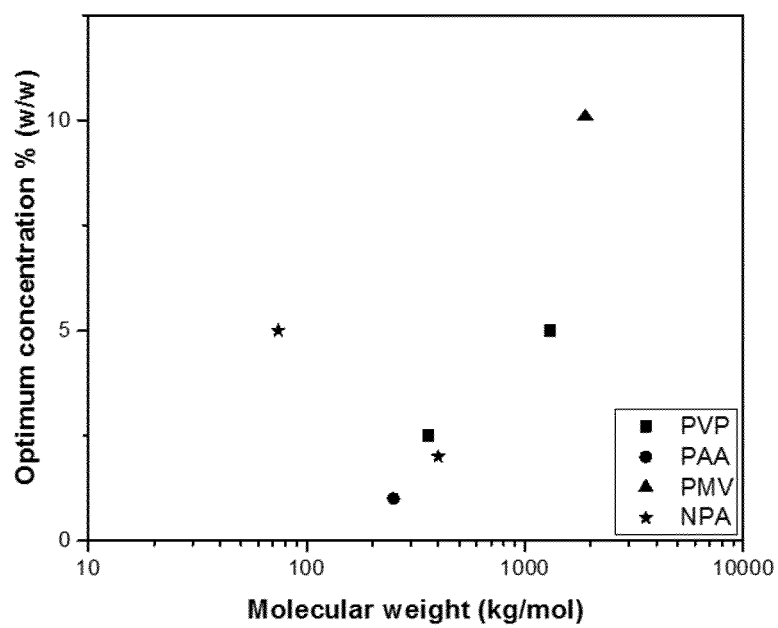
FIG. 2 shows the estimated optimum concentrations (% w/w) in PVOH-IPCFA blends identified for four different interpolymer complex forming polymers; polyvinyl pyrrolidone (PVP), polyacrylic acid (PAA), poly(methyl vinyl ether-alt-maleic acid) (PMV), and nonionic polyacrylamide (NPA). The x-axis of FIG. 2 represents $M_w$.

The optimum compositions of PVOH and different IPCFA:s were identified by rheological studies. The optimum concentrations of different polymers are presented in FIG. 2, which includes the IPCFAs $PVP_m$, $PVP_{high}$, $PAA_{low}$, $PMV_{high}$, $PMV_{low}$, $NPA_{low}$ and $NPA_{high}$. FIG. 2 shows low optimum concentrations for the IPCFAs having a $M_w$ below 1980 kg/mol and particularly low optimum concentrations for the IPCFAs having a $M_w$ 1300 kg/mol, but above 74 kg/mol.

The shear viscosity at 10 $s^{-1}$ as a function of molecular weight and concentration of PVP in different PVOH qualities are shown in FIG. 3A-F. FIG. 3F also includes $PAA_{low}$. Notably, optimum concentrations could only be observed for the PVOH qualities having a $M_w$ above 61 kg/mol, but below 145 kg/mol. For the EVOH-like quality having an estimated $M_w$ of 70 kg/mol, no optimum concentration of $PVP_m$ could be observed in the range of 0-10% (see FIG. 3G).

FIG. 5 shows the OTR reaches an optimum (lowest point) at the same IPCFA concentration as the peak in viscosity. Hence conclusion regarding oxygen barrier properties can be drawn from FIG. 3.

Table 1 presents the OTR of coated films prepared in laboratory scale experiments by rod coating, and the OTR of coated carton board in semi-pilot scale by curtain coating. Based on the optimizations, the IPCFAs were used in the following concentrations: PMV about 2.5% (w/w), NPA about 2% (w/w), PAA about 1% (w/w) and PVP about 2.5% (w/w). The comparison of $OTR_{rod}$ and $OTR_{cur}$ indicates similar trends, that is that the barrier properties are improved by the inclusion of small amounts of IPCFA. The pH was adjusted in a number of experiments, and the pH values indicated with "*" are the actual pH of the system without pH-adjustment.

TABLE 1

OTR (ml/m² day atm) of coated films (at 23° C.)

| | | Rod coating | | | | Curtain coating | | | |
|---|---|---|---|---|---|---|---|---|---|
| Barrier composition | pH | OTR 50% RH | OTR 80% RH | OTR$_{80}$/OTR$_{50}$ | d | OTR 50% RH | OTR 80% RH | OTR$_{80}$/OTR$_{50}$ | d |
| PVOH | 7* | 5 | 10 | 2 | 1.8 | 6 | 11 | 2 | 1.6 |
| PVOH 10% (w/w) nanofiller | 7* | 3 | 7 | 2 | 1.8 | 2 | 6 | 3 | 1.6 |
| PVOH-PMV$_{low}$ | 4* | N/A | 5 | N/A | 1.8 | 2 | 5 | 2 | 1.7 |
| PVOH-PMV$_{low}$ | 3 | N/A | N/A | N/A | N/A | N/A | 9 | N/A | 1.7 |
| PVOH-PMV$_{low}$ | 5 | N/A | N/A | N/A | N/A | N/A | 9 | N/A | 1.6 |
| PVOH-PMV$_{low}$ 10% (w/w) nanofiller | 5* | 3 | 7 | 2 | 1.9 | 2 | 5 | 2 | 1.6 |
| PVOH-PMV$_{low}$ 10% (w/w) nanofiller | 4 | 5 | N/A | N/A | N/A | 2 | 10 | 5 | 1.6§ |
| PVOH-NPA$_{high}$ | 7* | 3 | 6 | 2 | 1.3 | N/A | 8 | N/A | 1.6§ |
| PVOH-NPA$_{high}$ 10% (w/w) nanofiller | 7* | N/A | 8 | N/A | 1.5 | N/A | N/A | N/A | 1.6§ |
| PVOH-PAA$_{low}$ | 5* | N/A | N/A | N/A | N/A | 2 | 5 | 2 | 1.6§ |
| PVOH-PAA$_{low}$ 10% (w/w) nanofiller | 5.5* | N/A | N/A | N/A | N/A | 3 | 4 | 1 | 1.6§ |
| PVOH-PVP$_m$ | 7* | 3 | 6 | 2 | N/A | N/A | N/A | N/A | 1.6§ |
| PVOH-PVP$_m$ 10% (w/w) nanofiller | 7* | N/A | N/A | N/A | N/A | N/A | 9 | N/A | 1.6§ | d means thickness (μm) of the PVOH-based gas barrier layer as measured by SEM
§Value estimated based on applied amount When evaluating the results, it should also be kept in mind that the coating thickness (as measured by SEM) was in the order of 1-2 μm. It should also be emphasized that the experimental methods have not been fully optimized, and the properties of the barrier layers have been determined when testing the layers individually, and not in a sandwich construction as they would be used in the packaging industry. Depending on the requirements of the specific packaging, various barrier layers can be combined, for example layer with good moisture barrier properties can be used to protect a layer with good oxygen barrier properties, but with lower resistance to moisture. While the aim of the present disclosure is however to make available a barrier layer with improved oxygen barrier properties also at high moisture conditions, such layers can of course be used in combination with other layers.

The results indicate that highly desirable barrier properties, in particular barrier properties at high relative humidity, can be achieved by a process which is well suited for industrial application. Further, the use of nanofillers and interpolymer complexation agents can be minimized. It may also be possible to produce barrier layers which do not need to be covered with additional protecting layers, which is required in many competing processes.

REFERENCES

WO 2004/089624—Packaging; Arnoldus J. Kruger and Patricia A. Truter
WO 2013/064500—Coating composition, a method for coating a substrate, a coated substrate, a packaging material and a liquid packaging; Johan Larsson and Anders Karlsson
Labuschagne P W, Germishuizen W A, C. Verryn S M, Moolman F S (2008), Improved oxygen barrier performance of poly(vinyl alcohol) films through hydrogen bond complex with poly(methyl vinyl ether-co-maleic acid), European Polymer Journal 44:2146-2152 doi: https://doi.org/10.1016/j.eurpolymj.2008.04.015
Lim M, Kim D, Seo J (2016), Enhanced oxygen-barrier and water-resistance properties of poly(vinyl alcohol) blended with poly(acrylic acid) for packaging applications, Polymer International 65:400-406 doi:10.1002/pi.5068

The invention claimed is:

1. A packaging material comprising a fiber based substrate and a gas barrier layer based on a polyvinyl alcohol (PVOH), wherein said gas barrier layer comprises an inter-polymer complex forming agent (IPCFA), which IPCFA is a water-soluble polymer exhibiting functional groups capable of forming hydrogen bonds with —OH groups of the PVOH, wherein said PVOH has a weight average molecular weight (Mw) measured according to ASTM D4001-13 in a range of 80 kg/mol to 135 kg/mol, a proportion of said IPCFA to PVOH in said gas barrier layer is in a range of 0.5 to 7.0% (w/w) and said packaging material having an oxygen transmission rate and an oxygen permeability (OP) below 14 ml μm/m² day atm, which OP is obtained by multiplying the oxygen transmission rate (OTR) of the packaging material measured according to ASTM F1927-7 at a relative humidity (RH) of 80% and 23° C. by the thickness of the gas barrier layer.

2. The packaging material according to claim 1, wherein said IPCFA has a weight average molecular weight (Mw) in an interval of 10 kg/mol to 1500 kg/mol.

3. The packaging material according to claim 2, wherein said IPCFA has a weight average molecular weight (Mw) in the interval of 100 kg/mol to 700 kg/mol.

4. The packaging material according to claim 1, wherein said IPCFA is chosen from polyacrylic acid, polyvinyl pyrrolidone, and non-ionic polyacrylamide.

5. The packaging material according to claim 1, wherein an proportion of said IPCFA to PVOH in the gas barrier layer is in an interval of 0.5 to 6% (w/w).

6. The packaging material according to claim 1, wherein said fiber fibre based substrate is a paper or paper board comprising at least one fiber based layer.

7. The packaging material according to claim 1, wherein said packaging material has an oxygen transmission rate (OTR) in an interval 0.1 to 3 ml/m² day atm, measured according to ASTM F1927-07 and at a relative humidity (RH) of 50% and 23° C.

8. The packaging material according to claim 1, wherein said packaging material has an oxygen transmission rate (OTR) in an interval of 0.5 to 3 ml/m² day atm, measured according to ASTM F1927-07 and at a relative humidity (RH) of 80% and 23° C.

9. A method for the production of a packaging material according to claim 1, wherein a coating composition comprising said PVOH and said IPCFA dissolved in a first solvent is provided, and said coating composition is applied onto said substrate to form said PVOH-based gas barrier layer.

10. The method according to claim 9, wherein the formation of said PVOH-based gas barrier layer comprises drying the applied coating composition at a temperature below the boiling point of said first solvent.

11. The method according to claim 9, wherein the formation of said PVOH-based gas barrier layer comprises drying the applied coating composition and heating the dried coating composition.

12. The method according to claim 9, wherein said PVOH-based layer, after it has been dried and optionally heated, is crosslinked by contacting it with a crosslinking agent to achieve crosslinking of the polymers.

* * * * *